(12) United States Patent
Xu et al.

(10) Patent No.: US 12,304,741 B1
(45) Date of Patent: May 20, 2025

(54) FEEDING DEVICE FOR SUBWAY GRILLE MAIN REINFORCEMENT CONVEYING

(71) Applicant: Tianjin University, Tianjin (CN)

(72) Inventors: Lianyong Xu, Tianjin (CN); Kangda Hao, Tianjin (CN); Hao Wang, Tianjin (CN); Yongdian Han, Tianjin (CN); Lei Zhao, Tianjin (CN); Wenjing Ren, Tianjin (CN); Tianzhu Wang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/925,152

(22) Filed: Oct. 24, 2024

(30) Foreign Application Priority Data

Jan. 12, 2024 (CN) .......................... 202410048141.4

(51) Int. Cl.
| | |
|---|---|
| *B65G 17/26* | (2006.01) |
| *B65G 17/32* | (2006.01) |
| *B65G 17/44* | (2006.01) |
| *B65G 23/24* | (2006.01) |
| *B65G 45/14* | (2006.01) |
| *E21D 11/14* | (2006.01) |

(52) U.S. Cl.
CPC ............. *B65G 17/26* (2013.01); *B65G 17/32* (2013.01); *B65G 17/44* (2013.01); *B65G 23/24* (2013.01); *E21D 11/14* (2013.01); *B65G 2203/0233* (2013.01); *B65G 2203/044* (2013.01)

(58) Field of Classification Search
CPC ........ B65G 17/26; B65G 17/32; B65G 17/44; B65G 23/24; B65G 45/14; E21D 11/14
USPC ...................................... 198/497, 498, 502.3
See application file for complete search history.

(56) References Cited

U.S. PATENT DOCUMENTS

| | | | | |
|---|---|---|---|---|
| 5,240,102 A | * | 8/1993 | Lucas ................... | B65G 47/244 198/782 |
| 7,083,039 B2 | * | 8/2006 | Schloesser ............. | B65G 45/18 198/496 |
| 7,240,786 B2 | * | 7/2007 | Boyadjian ............... | B42B 5/123 198/496 |

(Continued)

FOREIGN PATENT DOCUMENTS

| | | |
|---|---|---|
| CN | 213264127 U | 5/2021 |
| CN | 214826453 U | 11/2021 |

(Continued)

*Primary Examiner* — Douglas A Hess
(74) *Attorney, Agent, or Firm* — Bayramoglu Law Offices LLC

(57) ABSTRACT

A feeding device for subway grille main reinforcement conveying includes two-layer chain plate conveyor arranged at an upper and a lower interval, and the chain plate conveyor is a climbing structure with one end high and one end low, two ends of the chain plate conveyor are fixedly connected to a support frame, and the chain plate conveyor is erected on a working plane through the support frame. The chain plate conveyor provides power through a motor reducer connected to a drive sprocket of the chain plate conveyor, and a higher end of the chain plate conveyor is provided with a position detection sensor. The position detection sensor can detect the position of the main reinforcement, and control the start and stop of the motor reducer and the grasping of the main reinforcement by a manipulator through feeding back the position of the main reinforcement to a main control system.

6 Claims, 2 Drawing Sheets

(56) References Cited

U.S. PATENT DOCUMENTS

| | | | |
|---|---|---|---|
| 8,307,974 B2 * | 11/2012 | Saunders | F04B 19/20 198/626.1 |
| 10,010,990 B2 * | 7/2018 | Kurosumi | B23Q 17/2452 |
| 10,351,351 B2 * | 7/2019 | Schulte Strathaus | B65G 45/16 |
| 10,882,701 B2 * | 1/2021 | Muehlberger | B65G 43/08 |
| 11,691,823 B1 * | 7/2023 | Mohammed | B65G 21/10 198/502.3 |

FOREIGN PATENT DOCUMENTS

| | | |
|---|---|---|
| CN | 216334617 U | 4/2022 |
| CN | 114715590 A | 7/2022 |

* cited by examiner

FEEDING DEVICE FOR SUBWAY GRILLE MAIN REINFORCEMENT CONVEYING

CROSS REFERENCE TO THE RELATED APPLICATIONS

This application is based upon and claims priority to Chinese Patent Application No. 202410048141.4, filed on Jan. 12, 2024, the entire contents of which are incorporated herein by reference.

TECHNICAL FIELD

The present invention relates to the field of subway grille processing technology, in particular to a feeding device for subway grille main reinforcement conveying.

BACKGROUND

Subway construction is an effective guarantee to realize the connection of various functional areas of the city and alleviate traffic congestion, and the grille is an important part of supporting the subway tunnel to prevent collapse. The single-section subway grille is mainly welded by main reinforcements, connecting plates, several U-shaped reinforcements, and several Z-shaped reinforcements. The welding production of the grille mainly includes the main operation steps of feeding, welding, and blanking. At present, subway grille welding is still mainly manual welding, so it is inevitable that there are problems such as low welding efficiency, unstable weld quality, high labor intensity, poor working environment, difficult personnel management, and unpredictable construction period.

The grille is difficult to achieve all-round welding in space due to its complex spatial structure, there is no real sense of automatic welding production line for the grille currently. Especially, the main reinforcement of the grille is long in length and thick in diameter, which is inconvenient for manual handling, the curvature of the two main reinforcements in the same position is inconsistent due to the difference between the inner and outer rings, and the length, curvature, and shape of the main reinforcement of the grille corresponding to different positions are also different, which brings great difficulty to the design of the feeding device for the grille main reinforcement conveying. Therefore, the development of a feeding device for the grille main reinforcement conveying is an important part of realizing the automatic welding flow operation of the grille, so that the main reinforcement can be placed in its own position for the manipulator to grasp when it is transmitted to the reclaiming table, which can greatly improve the production efficiency of the grille and is of great significance to the subway construction.

SUMMARY

An objective of the present invention is to propose a feeding device for subway grille main reinforcement conveying to solve the technical problems described in the background art, and to realize the objective of automatically transmitting and feeding the main reinforcement and in a fixed attitude for a manipulator to grasp.

In order to achieve the above technical objective, the present invention adopts the following technical scheme:

a feeding device for subway grille main reinforcement conveying, including two-layer chain plate conveyor arranged at an upper and a lower interval, the chain plate conveyor is a climbing structure with one end high and one end low, two ends of the chain plate conveyor are fixedly connected to a support frame, and the chain plate conveyor is erected on a working plane through the support frame, the upper and lower two-layer chain plate conveyor provides power through a motor reducer connected to a drive sprocket of the chain plate conveyor, and a higher end of the chain plate conveyor is provided with a position detection sensor, the position detection sensor can detect the position of the main reinforcement, and control the start and stop of the motor reducer and the grasping of the main reinforcement by a manipulator through feeding back the position of the main reinforcement to a main control system;

several mounting holes arranged on a chain plate of the chain plate conveyor in a rectangular array, and some of the mounting holes can be detachably fixed with a limit block, several limit blocks form a clamping array, and the main reinforcement is placed on the chain plate conveyor along a gap between the limit blocks and is fixed by the clamping of the adjacent limit block.

Preferably, each layer of the chain plate conveyor includes two sets arranged at left and right intervals, and a gap is provided between the two sets of chain plate conveyors to facilitate the manipulator to explore and grasp the main reinforcement.

Preferably, the two sets of chain plate conveyors on the same layer are driven by the same motor reducer, and the drive sprockets of the two sets of chain plate conveyors on the same layer are arranged correspondingly, and the correspondingly arranged several drive sprockets achieve torque transmission and maintain synchronization through a connecting shaft.

Preferably, the chain plate conveyor is arranged in a form of a horizontal-inclined type, and the chain plate on a lower side of the chain plate conveyor is arranged in a horizontal state as a placement area of the main reinforcement.

Preferably, the mounting hole and the limit block are provided with mutually compatible threads, and the limit block is screwed in the mounting hole.

Preferably, a photoelectric induction sensor is selected for the position detection sensor.

Preferably, both ends of the lower chain plate conveyor exceed a certain distance from the end of the upper chain plate conveyor.

Compared with the existing technology, the beneficial effects of the present invention are as follows: the structure of the present invention is simple and the design is ingenious, the feeding conveying of the main reinforcement is realized through the two-layer chain plate conveyor with upper and lower intervals, and the conveying chain plate is improved in a targeted manner, the clamping array formed by the limit block realizes the simultaneous transmission of the main reinforcements with two different curvatures. moreover, the limit block can flexibly adjust the arrangement position according to requirements, which can adapt to the main reinforcements of various shapes, and effectively realize the efficient, stable, and safe feeding conveying of the main reinforcements.

BRIEF DESCRIPTION OF THE DRAWINGS

By combining the detailed description of the following drawings, the above and/or other aspects and advantages of the present invention will become clearer and easier to understand, these drawings are only schematic and do not limit the present invention, wherein.

Figure 1:
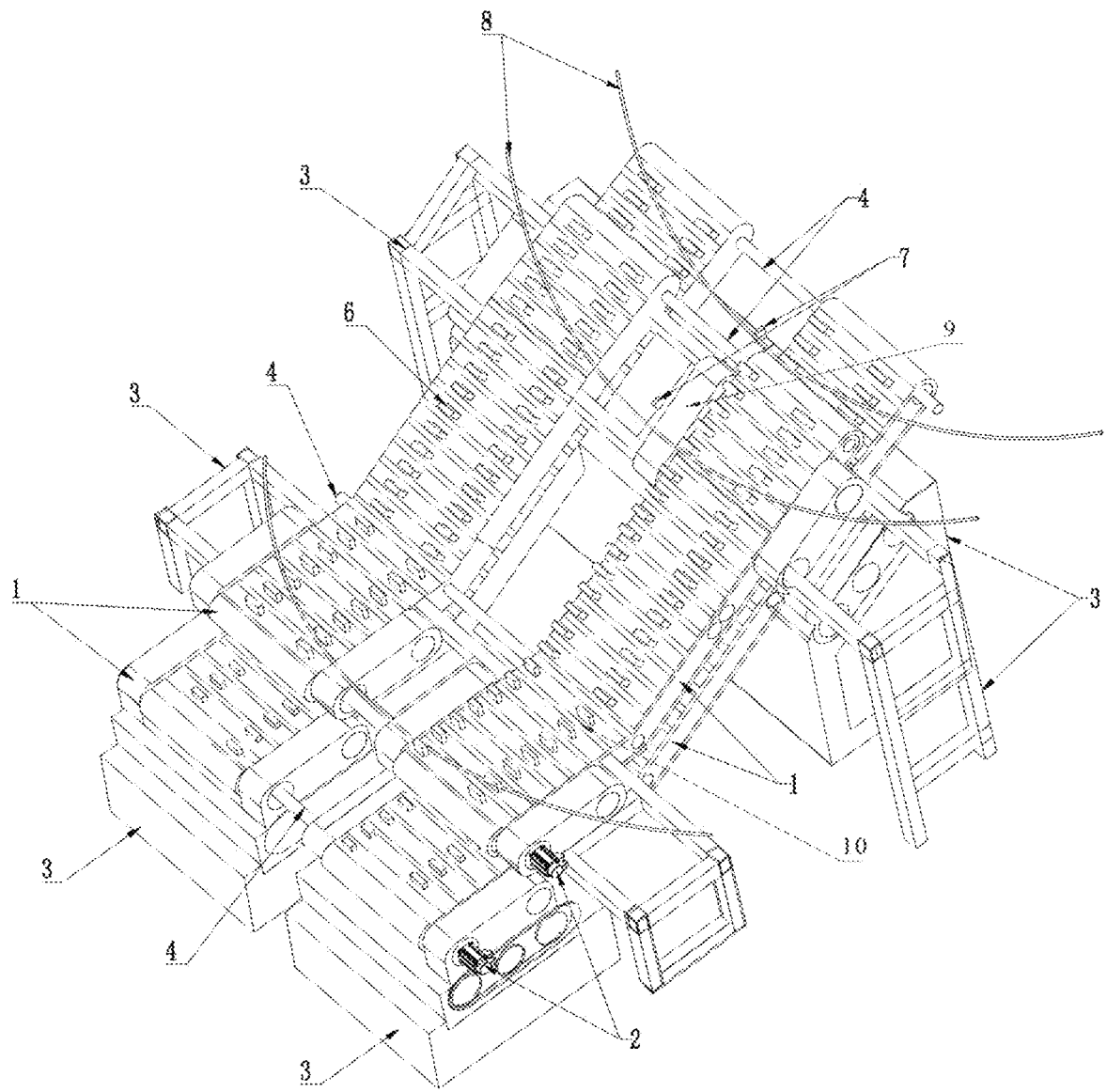
FIG. 1 is a structural diagram of the present invention.

Reference numerals in figures: 1, a chain plate conveyor; 2, a motor reducer; 3, a support frame; 4, a connecting shaft; 5, a mounting hole; 6, a limit block; 7, a position detection sensor; 8, a main reinforcement; 9, a manipulator; 10, a second gap.

DETAILED DESCRIPTION OF THE EMBODIMENTS

In the following, an embodiment of the feeding device for subway grille main reinforcement conveying is described with reference to the attached drawings. The embodiments recorded here are the specific detailed embodiments of the present invention, which are used to illustrate the conception of the present invention, they are explanatory and exemplary, and should not be interpreted as limitations on the embodiments and scope of the present invention. In addition to the embodiments recorded herein, technicians in this field are also able to adopt other technical solutions that are obvious based on the content disclosed in the claim and specification of this application. These technical solutions include the adoption of technical solutions that make any obvious substitutions and modifications to the embodiments recorded herein.

In the above description of the present invention, it is to be noted that the orientation or positional relationship indicated by terms 'front', 'back', 'left', 'right', 'top', 'bottom', 'up', 'down', 'inside', 'outside', etc. is based on the orientation or positional relationship shown in the accompanying drawings, merely for ease of description and simplification of the description of the present invention, and not to indicate or imply that the referenced device or element must have a particular orientation and be constructed and operative in a particular orientation, and thus may not be construed as a limitation on the present invention. In addition, the terms 'first' and 'second' are only used for descriptive purposes and cannot be understood as indicating or implying relative importance.

The drawings attached to this specification are schematic diagrams, which assist in explaining the conception of the present invention, and schematically represent the shapes of each part and their relationships. Please note that in order to clearly show the structure of each component of the embodiment of the present invention, the drawings are not drawn in the same proportion. The same reference mark is used to represent the same part.

The principle and characteristics of the present invention are described in the following drawings, the embodiments are merely used to explain the present invention, not to limit the scope of the present invention. The following is a further detailed description of the preferred embodiment of the present invention in combination with FIGS. 1-2:

As shown in FIG. 1, a preferred feeding device for subway grille main reinforcement conveying of the present invention, including two-layer chain plate conveyor 1 arranged at an upper and a lower interval, each layer of chain plate conveyor 1 includes two sets arranged at left and right interval, and a gap is provided between the two sets of chain plate conveyors 1 to facilitate the manipulator 9 to explore and grasp the main reinforcement 8, each set of the chain plate conveyor 1 is a climbing structure with one end high and one end low and is arranged in the form of horizontal-inclined type, two ends of the chain plate conveyor are fixedly connected to a support frame 3, and the chain plate conveyor 1 is erected on a working plane through the support frame 3, and the chain plate on a lower side of the chain plate conveyor 1 is arranged in a horizontal state as a feeding placement area of the main reinforcement 8, the higher end of the chain plate conveyor 1 is used as a positioning area, and the a higher end of the chain plate conveyor is provided with a photoelectric induction sensor as a position detection sensor 7, the photoelectric induction sensor is correspondingly fixed on the support frame 3 in the gap between the two sets of chain plate conveyor 1 connected on the same layer.

In order to ensure that the same layer of two chain plate conveyor 1 at the same rate to carry out the conveying of the main reinforcement 8, the upper and lower two-layers chain plate conveyor 1 provides power through a motor reducer 2 connected to a drive sprocket of the chain plate conveyor, and the two sets of chain plate conveyors 1 on the same layer are driven by the same motor reducer 2, the motor reducer 2 is mounted on the lower side of the chain plate conveyor 1, the drive sprockets of the two sets of chain plate conveyors 1 on the same layer are arranged correspondingly, and the correspondingly arranged several drive sprockets achieve torque transmission and maintain synchronization through a connecting shaft 4, three connecting shafts 4 are preferably arranged between two sets of chain plate conveyor 1 on the same layer, the three connecting shafts 4 are respectively arranged at the bottom end of chain plate conveyor 1 (coaxial position with the driving shaft of motor reducer 2), the top end of chain plate conveyor 1, and the corner position of horizontal section and inclined section of chain plate conveyor 1, wherein one connecting shaft 4 which is coaxially connected to the driving shaft of the motor reducer 2 is used as the active force axis to drive the chain plate conveyor 1 to run, and the remaining two connecting shafts are used as the driven force axis to ensure the synchronization of operation, moreover, the motor reducer 2 is arranged with an internal contracting brake, which can effectively prevent the reversal;

In order to prevent the upper chain plate conveyor 1 from interfering with the placement and grasping of the main reinforcement 8 on the lower chain plate conveyor 1, both ends of the lower chain plate conveyor 1 exceed the end of the upper chain plate conveyor 1 for a certain distance to avoid interference at the working position.

Figure 2:
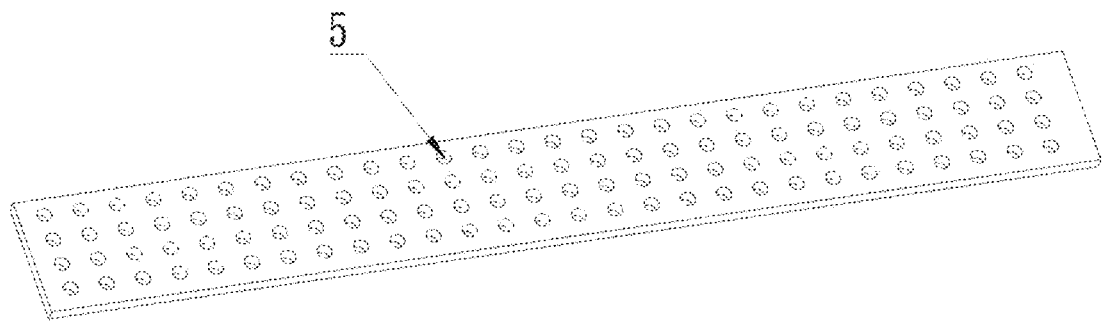
FIG. 2 is a schematic diagram of an enlarged structure at a chain plate of a chain plate conveyor of the present invention.

As shown in FIG. 2, due to the difference in the curvature of the upper and lower layers of the main reinforcement 8, and the length and shape of the main reinforcement 8 corresponding to different tunnel diameters and shapes are also quite different, therefore, how to effectively fix various types of main reinforcement 8 through the chain pate conveyor 1 is a very difficult problem, the present invention solves the above problem by means of the limit block 6 matrix for the sake of the versatility, that is, several mounting holes 5 are evenly provided on the chain plate of the chain plate conveyor 1 in a rectangular array, and the limit block 6 can be detachably fixed at the corresponding part of the mounting hole 5 for different main reinforcement 8, and several limit blocks 6 form a clamping array, the main reinforcement 8 to be transported is placed on the chain plate conveyor 1 along the gap between the limit blocks 6, and is fixed by the clamping of the adjacent limit block 6, it is only necessary to adjust the arrangement position of the limit block 6 accordingly when the shape and curvature of the main reinforcement 8 change, for the convenience of installation and disassembly, on the premise of ensuring the reliable fixation, the mounting hole 5 and the limit block 6 are realize the detachable fixation in a screwed manner, that is, an internal thread is arranged in the mounting hole 5, and the corresponding thread is engraved on the limit block 6, it is only need to tighten the limit block 6 at mounting holes 5 in the corresponding position during mounting.

The chain plate conveyor 1 described in the present invention is a conveyor that uses a series of chain plates fixed on the traction chain to transport materials in the horizontal or inclined direction, the single steel plate is hinged into an annular belt as the traction and bearing component of the conveyor, it is mainly composed of a driving mechanism (motor reducer), a tensioning device, a traction chain, a slat, a driving and reversing driving sprocket, and a frame, the chain of the chain plate conveyor 1 in the present invention is fixed on both sides of the middle chain plate, and the top surface of the chain is lower than the top surface of the middle chain plate to prevent the main reinforcement 8 from pressing on the chain when it is placed, the middle chain plates are hinged to each other, there is a relative rotational freedom between the chain plate and the chain plate, the middle chain plate is modified in a targeted manner, the whole structure is arranged in a hollow structure, and the chain plate is evenly distributed with through holes which is convenient to mount the limit block 6, the limit block 6 is mounted and assembled through multiple through holes to realize the positioning of the main reinforcement 8 with different curvatures and different shapes, it is only necessary to adjust the position of the limit block 8 when transmitting different types of main reinforcement 8.

The photoelectric induction sensor as the position detection sensor 7 can detect the position of the main reinforcement 8, as shown in FIG. 1, the photoelectric induction sensor is mounted on the support frame 3 at the gap of the chain plate conveyor 1, and the position of the main reinforcement 8 can be fed back to the main control system to control the start and stop of the motor reducer 2 and the grasping of the main reinforcement 8 by the manipulator 9, specifically, when the main reinforcement 8 passes above the sensor, the main control system controls the corresponding motor reducer 2 to stop providing power, and the main reinforcement 8 stays at the current position waiting for the manipulator 9 to probe and grasp, when the main reinforcement 8 is taken away by the manipulator 9, the sensor loses the induction signal and feeds back to the main control system, the main control system controls the corresponding motor reducer 2 to continue to provide power until the sensor again provides the induction signal (that is, the next main reinforcement 8 is transported in place).

The above embodiments are merely preferred embodiments of the present invention, but not intended to limit the present invention, and any modifications, equivalent replacements, improvements, etc. made within the spirit and principles of the disclosure should fall within the scope of protection of the present invention.

What is claimed is:

1. A feeding device for subway grille main reinforcement conveying, comprising two-layer chain plate conveyor arranged at an upper and a lower interval, the chain plate conveyor is a climbing structure with one end high and one end low, two ends of the chain plate conveyor are fixedly connected to a support frame, and the chain plate conveyor is erected on a working plane through the support frame, the upper and lower two-layer chain plate conveyor provides power through a motor reducer connected to a drive sprocket of the chain plate conveyor, a higher end of the chain plate conveyor is provided with a position detection sensor, the position detection sensor is configured to detect a position of a main reinforcement, and control a start and a stop of the motor reducer and a grasping of the main reinforcement by a manipulator through feeding back the position of the main reinforcement to a main control system; each layer of chain plate conveyor comprises two sets arranged at left and right interval, and a first gap is provided between the two sets of chain plate conveyors to facilitate the manipulator to explore and grasp the main reinforcement; and several mounting holes are arranged on a chain plate of the chain plate conveyor in a rectangular array, and some of the mounting holes are configured to be detachably fixed with a limit block, several limit blocks form a clamping array, and the main reinforcement is placed on the chain plate conveyor along a second gap between the limit blocks and is fixed by a clamping of the adjacent limit block, a feeding conveying of the main reinforcement is realized through the two-layer chain plate conveyor arranged at the upper and the lower interval, and a simultaneous transmission of the main reinforcement with two different curvatures is realized through the clamping array formed by the limit blocks.

2. The feeding device for subway grille main reinforcement conveying according to claim 1, wherein the two sets of chain plate conveyors on a same layer are driven by the same motor reducer, the drive sprockets of the two sets of chain plate conveyors on the same layer are arranged correspondingly, and the correspondingly arranged several drive sprockets achieve torque transmission and maintain synchronization through a connecting shaft.

3. The feeding device for subway grille main reinforcement conveying according to claim 1, wherein the chain plate conveyor is arranged in a form of a horizontal-inclined type, and the chain plate on a lower side of the chain plate conveyor is arranged in a horizontal state as a placement area of the main reinforcement.

4. The feeding device for subway grille main reinforcement conveying according to claim 1, wherein the mounting hole and the limit block are provided with mutually compatible threads, and the limit block is screwed in the mounting hole.

5. The feeding device for subway grille main reinforcement conveying according to claim 1, wherein a photoelectric induction sensor is selected for the position detection sensor.

6. The feeding device for subway grille main reinforcement conveying according to claim 1, wherein both ends of the lower chain plate conveyor exceed a certain distance from the end of the upper chain plate conveyor.

* * * * *